United States Patent [19]

Goldsmith

[11] 4,265,080
[45] May 5, 1981

[54] HARVESTING APPARATUS

[76] Inventor: Sydney A. Goldsmith, 51 Middleton Rd., Christchurch, New Zealand

[21] Appl. No.: 21,636

[22] Filed: Mar. 19, 1979

[30] Foreign Application Priority Data

Mar. 10, 1978 [NZ] New Zealand .................. 186664
Dec. 15, 1978 [NZ] New Zealand .................. 189179

[51] Int. Cl.³ ............................................ A01D 46/00
[52] U.S. Cl. .................................. 56/330; 56/328 R
[58] Field of Search .............................. 56/330, 328 R

[56] References Cited

U.S. PATENT DOCUMENTS

| 3,245,211 | 4/1966 | Wieygandt et al. | 56/330 |
| 3,344,591 | 10/1967 | Christie et al. | 56/330 |
| 3,449,895 | 6/1969 | Perties | 56/330 |
| 3,494,117 | 2/1970 | Wieygandt et al. | 56/330 |
| 3,636,688 | 1/1972 | Fontan et al. | 56/330 |
| 3,727,388 | 4/1973 | Smith | 56/330 |
| 4,014,160 | 3/1977 | Mecca | 56/330 |
| 4,016,711 | 4/1977 | Claxton | 56/330 |
| 4,114,463 | 9/1978 | Garden et al. | 56/330 |
| 4,173,859 | 11/1979 | Goldsmith et al. | 56/330 |

Primary Examiner—Paul J. Hirsch
Attorney, Agent, or Firm—Murray and Whisenhunt

[57] ABSTRACT

Harvesting apparatus for harvesting fruit, berries, and similar produce, including at least one pair of vibratable shaker head assemblies, each having a plurality of harvesting fingers which are subjected to rotational and vibrational movement by the shaker heads. Each shaker head of a pair is mounted on a support, and each support is mounted for pivotal movement independent of the other support about a common axis which is located substantially centrally along a line extending substantially transversely between the shaker head assemblies. Independent pivotal movement of the supports permits good penetration of produce bearing plants or bushes by the fingers.

12 Claims, 7 Drawing Figures

HARVESTING APPARATUS

This invention relates to harvesting apparatus which is usable to dislodge fruit berries and like produce by shaking and vibrating the produce bearing plants or bushes.

In our U.S. Pat. No. 4,173,859 there is disclosed a straddle type harvester which has a pair of vibrating shaker head assemblies located on preferably both sides of the harvester frame. The output of each head assembly is coupled to a vertically disposed shaft on which are located a number of sets of radially spaced tines or fingers. Each pair of head assemblies are mounted on a frame which is movable transverse of the frame and can pivot about a substantially vertical axis. In this way the tined shafts can move into or away from the produce bearing plants or bushes to follow the contours thereof.

It has now been found that whilst the arrangement has worked successfully full penetration of the bushes or plants has not always occurred. This has resulted in part from one tined shaft of the pair having influence on the other shaft of the pair because of the common mounting frame of the pair of head assemblies. In addition it has been found that the transverse movement of the mounting frame has not been as free moving as required and this has further lead to the tines or fingers not fully penetrating the plant or bush.

The shaker head assemblies each have an input and output with the output being mounted for rotary movement relative to the frame of the harvester. The outputs of each head assembly are coupled together so as to have the same rotary motion. A prime mover supplies rotational motion to the inputs of the head assemblies and each head assembly has means which converts the rotary motion to a torsional vibration in the output. The inputs of the or each pair of head assemblies are coupled such that the vibrational movement of one head assembly is maintained constant relative to the other head assembly.

One object of the invention is thus to provide a mounting and drive arrangement for the shaker head assemblies of a harvesting apparatus whereby the head assemblies of the or each pair of head assemblies have the same rotary motion and the vibrational movement of one head assembly is held constant with respect to that of the other head assembly but the movement of head assemblies relative to the harvester frame are independent of one another.

To increase the yield of harvest it is important to achieve a good penetration of the plants or bushes by the tines or fingers and to also ensure that the vibrating and shaking of the plants or bushes takes place during the major portion of the time the harvester takes to pass over the particular section of the plant or bush being processed. To achieve full penetration attempts have been made to have the tines or fingers of a shaker head assembly on one side of the bush or plant overlap with the tines or fingers of a shaker head assembly on the other side of the harvester. Whilst good penetration results the plants or bushes are subject to damage as there is no control over the movement of the sets of tines or fingers on one side in relation to those on the other side. Thus if the sets are moving relatively toward one another or indeed away from one another tearing of the plants or bushes can result.

A second object of the invention is thus to provide a mounting and drive arrangement for the shaker head assemblies of a harvesting apparatus whereby in use of the apparatus good penetration of the produce bearing plants or bushes is achieved without damage thereto by the relative movement of the tines or fingers on opposite sides of the plants or bushes.

Broadly in one aspect of the invention there is provided a mounting and drive arrangement for the shaker head assemblies of a harvesting apparatus comprising at least one pair of vibrating shaker head assemblies, each of the assemblies having an input and an output, a prime mover, means for converting rotary motion applied to each input into a torsional vibration superimposed on the associated output member, the output members being mounted so as to enable a rotary motion to be superimposed thereon, coupling means which couple the output members together so that they have the same rotary motion, an intermediate shaft coupled to said prime mover, means which transfer rotary motion applied to said intermediate shaft to each of said input members such that the vibrational movement of one head assembly is maintained constant relative to the other head assembly, each shaker head assembly of the or each pair of head assemblies being supported by mounting means, said mounting means being mounted for pivotal movement independent of the other about an axis which is substantially coaxial with the intermediate shaft.

Broadly in a second aspect there is provided a harvesting apparatus having a main frame movable relative to the ground, a prime mover mounted thereon to provide power for relative movement between the frame and ground, at least one vibrating shaker head assembly mounted on each side of a longitudinal horizontal axis of the frame, mounting means for each shaker head assembly which is pivotally coupled to said frame, said mounting means being movable independent of one another, each vibrating shaker head assembly having an input and output and means which convert rotational motion supplied to the input into torsional vibration on the output, means for supplying rotational motion to said input such that the vibrational movement of one head assembly is maintained constant relative to the other head assembly, the outputs of the head assemblies being mounted so as to enable rotary motion to be superimposed thereon, coupling means which couple said outputs so that they have the same rotational movement and at least one set of radially disposed tines or fingers carried by an output member coupled to each said head assembly output the shaker head assemblies of the or each pair being positioned in a staggered relationship to each side of a longitudinal horizontal axis of said harvester frame.

To more fully describe the invention reference will be made to the accompanying drawing in which:

FIG. 4 is a perspective view of a straddle frame harvester according to the invention.

In describing the preferred forms of the invention reference will be made to a harvesting apparatus which has a pair of shaker head assemblies mounted one on each side of a horizontal longitudinal axis through the harvester frame. Such a harvester is illustrated in FIG. 4 and comprises a top frame 10 supported on legs 11 the lower ends of which are provided with land wheels 12. The harvester frame is thus of a straddle type and the top frame mounts a driving position 13. The leading end of the frame is provided with deflector plates 14 which provide an opening through which the produce bearing plants or bushes may readily pass. At the rear of the frame there are provided conveyors 15 which remove collected produce from collector plates (not shown) which run longitudinally on each side of the frame between the front and rear legs 11. Straddle type harvesters of this general type are well known to those skilled in the art and an example is illustrated in our previously referred to U.S. Pat. No. 4,173,859.

The top frame 10 of the harvester frame includes side members 16 and extending transversely between the side members 16 is a mounting frame 17. In the form of the invention illustrated in FIGS. 1 to 3 a prime mover 18 is mounted centrally in frame 17. V Belts 19 extend from a pulley wheel 20 on the prime mover 18 to a pulley wheel 21 on intermediate shaft 22.

Figure 1:
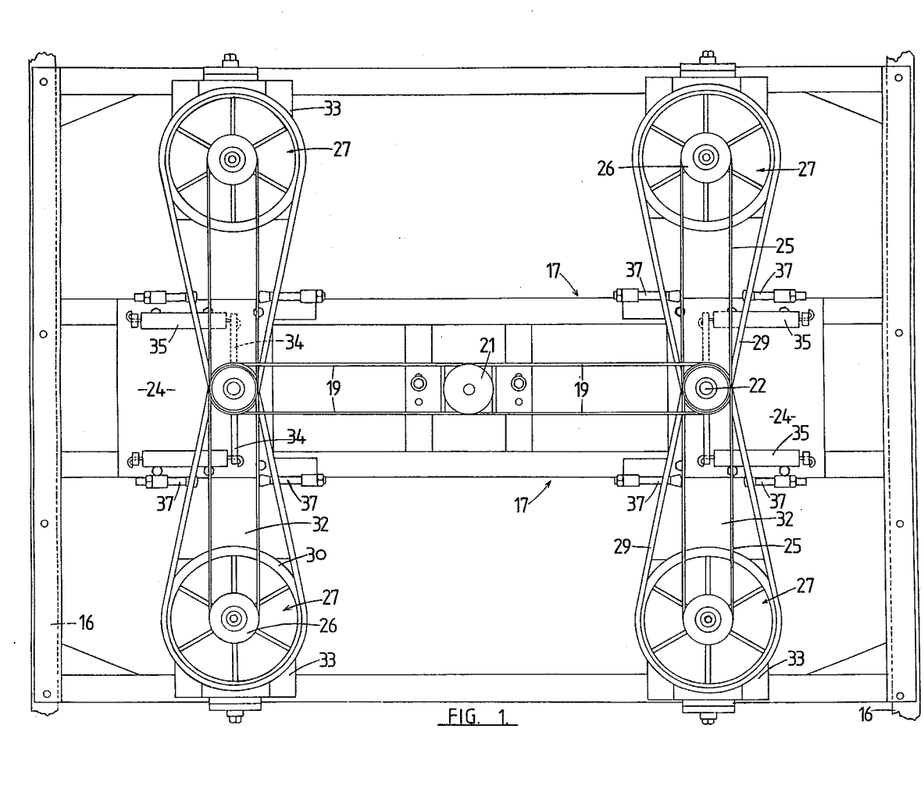
FIG. 1 is a plan view of one form of the invention.

Pulley wheel 21 is coupled to or formed integrally with pulley wheels 23 the resulting assembly being journalled for rotation on shaft 22. Shaft 22 is itself fixedly attached to a mounting plate 24 from which it extends vertically upwards. Pulley wheels 23 are of the tooth type and interenage with toothed belts 25. The belts 25 extend from intermediate shaft 22 to toothed pulley wheels 26 on the input of the shaker assembly 27.

A pair of toothed wheels 28 are also mounted for rotation on intermediate shaft 22 and these engage with chains 29 which extend about the toothed rings 30 on the housings of shaker assemblies 27.

Also mounted for rotational movement on intermediate shafts 22 are sleeves 31 which are situated between mounting plate 24 and the pair of toothed wheels 28. An arm 32 is attached to each sleeve 31 and extends outwardly to a shaker assembly mounting frame 33. Each sleeve 31 is provided with a projection 34 which extends in a direction which is substantially opposite to the arm 32. A spring 35 extends between each projection 34 to a fixture 36 on mounting plate 24. The shaker assembly mounting frames 33 are thus biassed to tend toward the centre of the harvester frame. To restrict the movement of arms 32 stop means are provided. These stop means consist of a threaded shaft 37 located in a collar 38 which is fixed to mounting plate 24. The amount of projection of the threaded shaft 37 from collar 38 can be adjusted with locknuts 39 provided for this purpose so that the amount of pivotal movement of arms 32 about the axis of intermediate shaft 24 can be regulated.

Figure 2:
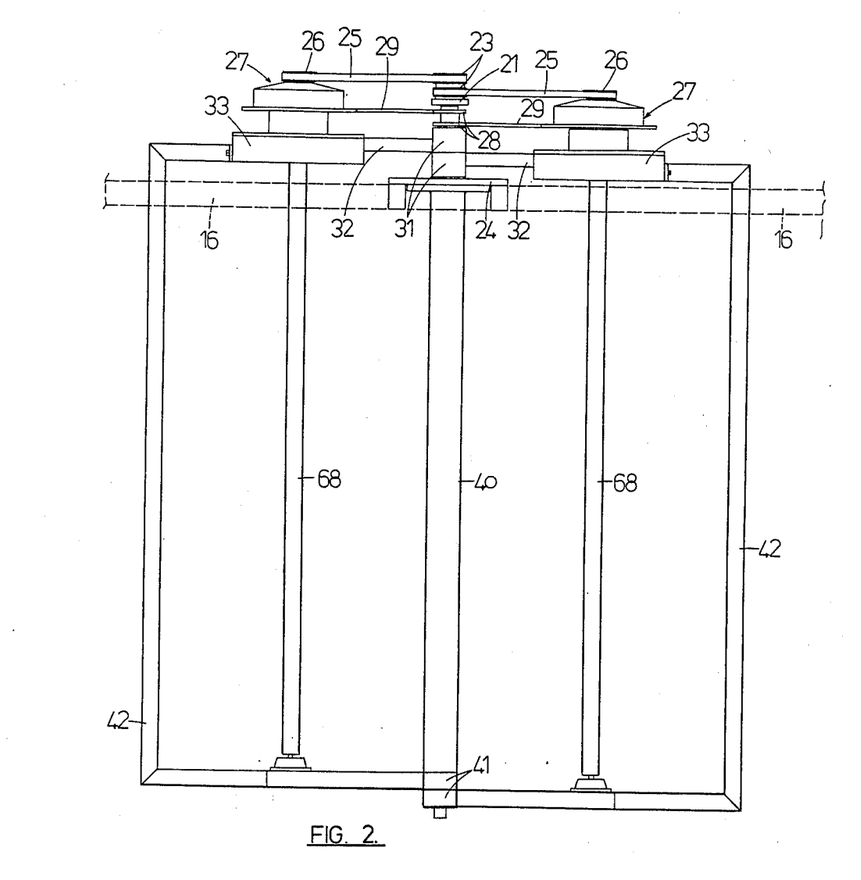
FIG. 2 is a side elevation view of the form of the invention illustrated in FIG. 1.

Referring to FIG. 2 there is shown a pillar 40 which extends downwardly from mounting plate 24 so that its central axis is substantially coaxial with the axis of intermediate shaft 22. Sleeves 41 are mounted for rotational movement at the lower end of pillar 40 and these sleeves 41 are attached to an L frame 42 which extends outwardly from sleeves 41 and then upwardly to couple with the outer end of shaker assembly mounting frame 33. The bottom of pillar 40 is not located in the form illustrated but could be located in a fixture attached to a lower side member of the harvester frame.

Figure 5:
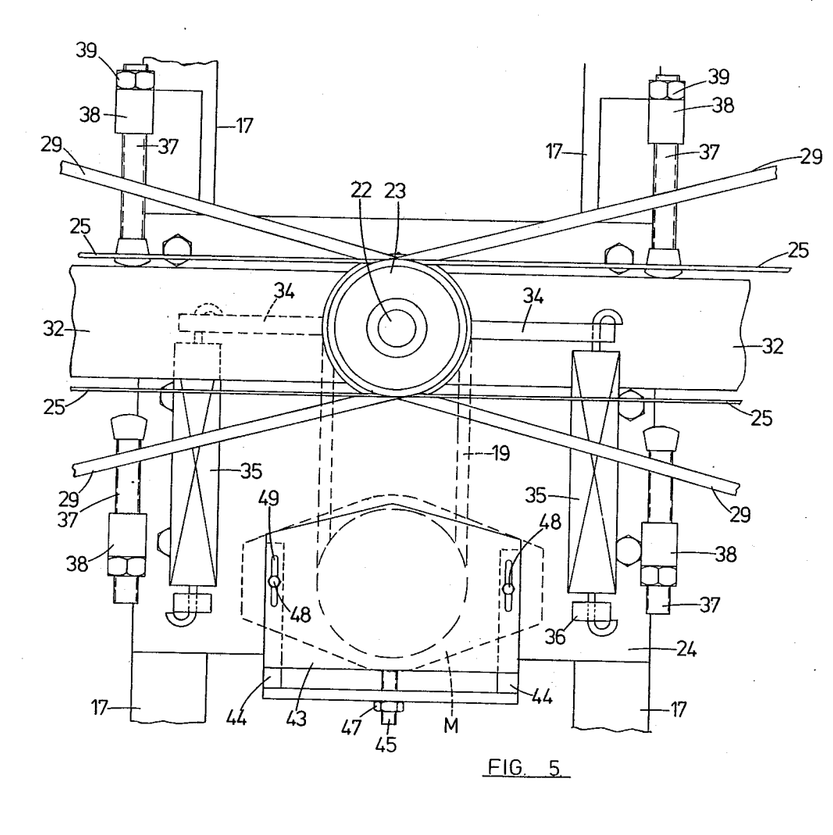
FIG. 5 is a detail plan view of the shaker head mounting arrangement.

Referring to FIG. 5 there is shown a mounting 43 to which an hydraulic motor M (shown in dotted detail) can be attached. This mounting 43 consists of a plate which is slidably located on arms 44 which are fixed to but located above (by supports not shown) the mounting plate 24. Plate 43 is provided with a threaded stud 45 which engages in an opening in cross member 46. A locknut 47 plus bolts 48 through slots 49 into arms 44 allows for adjustable fixture of the plate 43 on arms 44. With an hydraulic motor mounted in opening 50 in plate 43 a V belt can extend from the output of the hydraulic motor to pulley wheel 21 on intermediate shaft 22. In such an arrangement the central prime mover 18 with V belt 19 are not required thus resulting in the central area of top frame 10 being kept clear.

Figure 7:
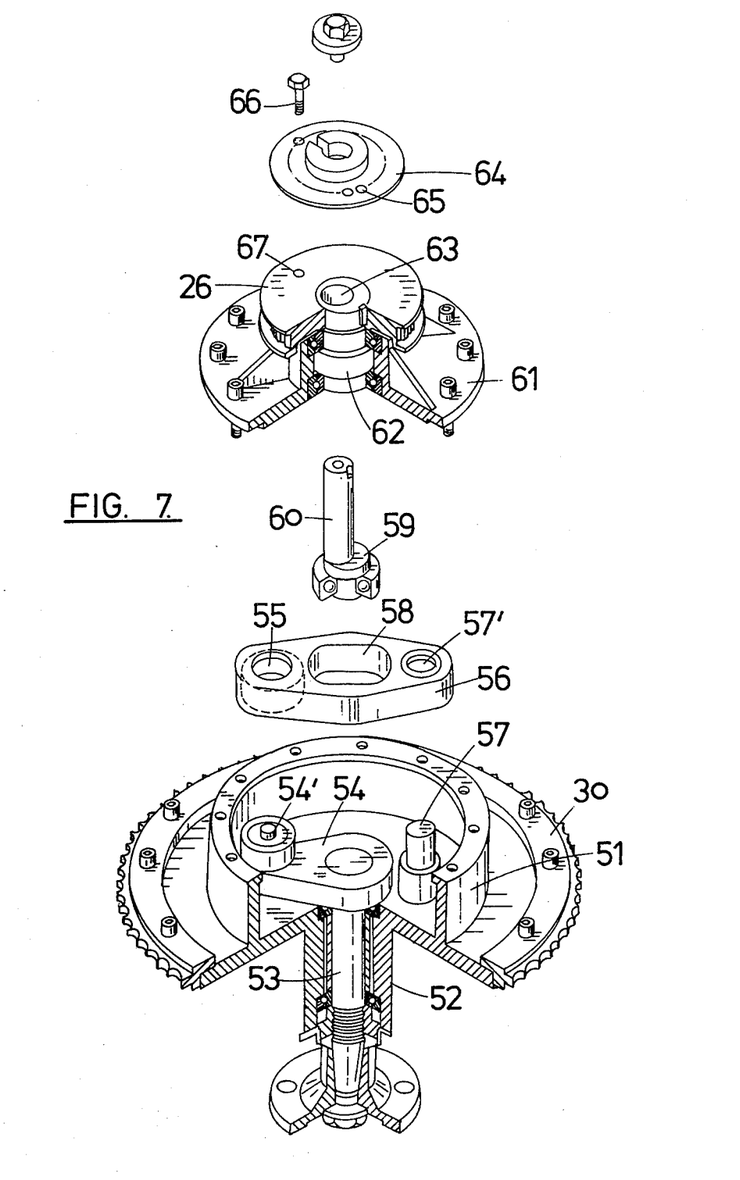
FIG. 7 is an exploded view of a type of shaker head assembly which is particularly suited for use with the invention.

The shaker head assemblies 27 are preferably of the type illustrated in FIG. 7 of the drawings. Each assembly consists of a cylindrical housing 51 which carries toothed ring 30. A sleeve 52 extends downwardly from the floor of cylindrical housing 51 and journalled for rotation in the sleeve is an output shaft 53. Sleeve 52 is itself journalled for rotational movement when attached to mounting plate 24.

The upper end of shaft 53 has a crank 54 with the outer end thereof carrying a projection 54'. This projection 54' engages in an opening 55 in a link 56. Link 56 is journalled for pivotal movement on a spigot 57 projecting from the floor of housing 51. An elongate opening 58 is provided in link 56 and the eccentric 59 of input shaft 60 locates within this opening 58.

A cover 61 is applied to the upper end of housing 51 and journalled for rotation within cover 61 is a sleeve 62 which has an eccentric bore 63. Input shaft 60 locates within sleeve 62 and is keyed to disc 64 which has a series of apertures 65 located on a circle concentric with the opening therein. Disc 64 is attached to the pulley wheel 26 which is keyed to sleeve 62 and this is effected by a bolt 66 engaging through an aperture 65 into a threaded opening 67 in toothed pulley 26.

Figure 3:
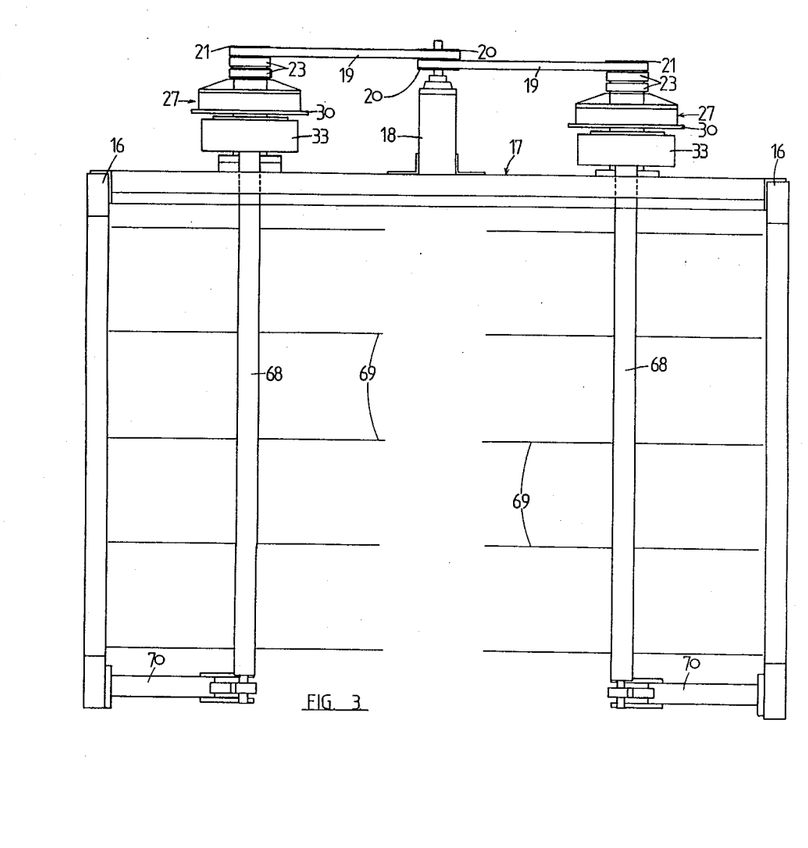
FIG. 3 is a front elevation of the form of the invention illustrated in FIGS. 1 and 2.

Referring to FIG. 3 of the drawings shafts 68 are shown and these are each attached to an output 53 of a shaker head assembly 27. Each shaft 68 carries a set of tines or fingers which are generally indicated at 69. It will be appreciated that in FIG. 3 the L frame 42 has been omitted for the interests of clarity. The lower ends of shaft 69 are journalled in suitable fixtures 70 which extend from the lower side member of the harvester frame.

In operation high speed rotational motion is applied to intermediate shaft 22 and this is transmitted through toothed belt 25 to the input shaft 60 of the shaker head assembly 27. Rotation of eccentric 59 in link 56 causes crank 54 to oscillate back and forth which sets up a vibrational movement in the output shaft 53. This vibrational movement is transferred to shaft 68 which causes the tines or fingers thereon to also vibrate. As sleeve 52 is mounted for rotational movement the passage of the tines or fingers through the produce bearing plants or bushes superimposes a rotary motion on output shaft 53. The rotary motion on the output shafts 53 of each pair of shaker head assemblies 27 is the same due to the coupling of the housings 51 by chains 29 extending around toothed rings 30.

To ensure that undesirable vibration is not set up in the harvester frame the shaker head assemblies of each pair are so coupled by the toothed belts 25 that the vibrational movement of one assembly can be maintained constant relative to the other assembly. This is preferably achieved by setting up one head assembly so that its amplitude of vibration is equal and opposite to that of the other head assembly. Such timing of the head assemblies is achieved by positioning the cranks 54 at opposite ends of their throw and then passing bolt 66 through the aperture 65 in disc 64 which is in a alignment with threaded opening 67. The operation and construction of the shaker head assembly is further described in U.S. Pat. No. 4,173,859.

Each shaker assembly mounting frame 33 is free to move about the axis of intermediate shaft 22 and can do so independent of any other shaker assembly mounting frame 33. Accordingly, the tined shafts 68 can follow the contours of the produce bearing plants or bushes without the movement of one shaft 68 being influenced by the movement of the other shaft 68 of the pair. The aforementioned timing of the shaker assembly head 27 of the pair is not significantly altered by pivotal movement about intermediate shaft 23 though it will be appreciated that the angular positions of the toothed timing and driving belts 25 about pulley wheels 21 does alter slightly in response to the pivotal movement of the mounting frames 33 about the axis of intermediate shaft 22.

If the threaded shafts 37 on the inboard side of mounting arms 32 were adjusted such that at their closest approach the tines or fingers of shafts 68 on opposite sides of the harvester frame can overlap a situation arises whereby damage can occur to the produce bearing plants or bushes. A close approach of the opposing tines or fingers is, however, desirable to ensure that there is good penetration of the plants or bushes.

Figure 6:
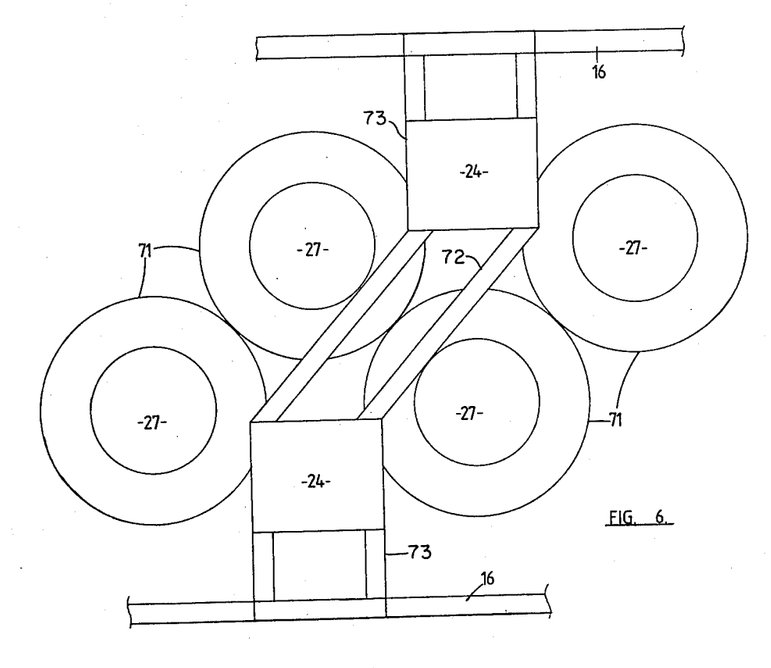
FIG. 6 is a plan view of a second form of the invention.

To achieve this required amount of penetration the shaker head assemblies on each side of the frame can be staggered in the manner shown in FIG. 6. In this drawing circles 71 indicate the peripheral boundaries of the tines or fingers associated with each of shafts 68. It will be seen that whilst the circles overlap the central longitudinal horizontal axis of the harvester frame the tines or fingers themselves do not overlap. This means that damage does not occur to the produce bearing plants or bushes due to the overlap of tines or fingers but at the same time extremely good penetration of the plants or bushes is achieved. In addition the time during which the plants or bushes are being shaken by the harvester during its passage thereover is considerably more than with the arrangement shown for example shown in FIG. 1. This overlapping of the circles of action of the tines or fingers can be applied to any straddle type harvester where there is at least one set of tines or fingers at either side of a horizontal longitudinal axis through the harvester frame.

With the mounting and driving arrangement shown in FIG. 1, however, the arrangement of FIG. 6 can be readily achieved by employing a cranked mounting frame 17. As shown in FIG. 6 the cranked frame has a middle portion 72 which is inclined to the outer portions 73 (which attach to side members 16) with the result that the mounting plates 24 are not transversely aligned. It will be appreciated that FIG. 6 is diagrammatic and the mounting plates 24 are shown without the arms 22 mounting frames 33 and the associated belts 25 and chains 29.

The pairs of shaker head assemblies 27 can be mounted in the manner described in this specification or could for example be mounted in the manner disclosed in our earlier U.S. Pat. No. 4,173,859. Alternatively, pairs of shaker head assemblies on either side of the longitudinal horizontal axis are not required as a single shaker head assembly on either side can be employed with the assemblies not being transversely aligned.

The present invention thus provides a mounting and drive arrangement for the shaker head assemblies of the harvesting apparatus where each of the shaker head assemblies can move independently of one another but pairs of assemblies are coupled together so that the rotary motion of the outputs are the same and the vibrational output of one assembly is maintained in a constant relationship with the vibrational movement of the output of the other assembly. The invention also provides a mounting and driving arrangement for the shaker head assemblies of a harvesting apparatus wherein good penetration of the produce bearing plants or bushes by the tines or fingers is achieved.

I claim:

1. A mounting and drive arrangement for shaker head assemblies of a harvesting apparatus, comprising:
   (a) at least one pair of vibrating shaker head assemblies, each of the assemblies having an input and an output with a respective associated input and output member;
   (b) a primer mover;
   (c) means for converting rotary motion applied to each input into a torsional vibration superimposed on the associated output member, the output members being mounted so as to enable a rotary motion to be superimposed thereon;
   (d) an intermediate shaft;
   (e) a pair of coupled pulley wheels coupled for rotation of said intermediate shaft, each of said pulley wheels having a positively engaging belt which couples it to the input of a shaker head assembly;
   (f) drive means for coupling said prime mover to said coupled pulley wheels; and
   (g) a pair of coupled sprocket wheels mounted for rotation on said intermediate shaft, each of the sprocket wheels being engaged by an endless chain which extends about a toothed ring located on a housing of each respective shaker head assembly, each shaker head assembly being supported by a respective mounting means, each said respective mounting means being mounted for pivotal movement independent of the other mounting means about an axis which is substantially coaxial with the intermediate shaft.

2. The arrangement as claimed in claim 1 wherein said drive means comprises a drive wheel mounted for rotation on said intermediate shaft and fixedly connected to said pair of coupled pulley wheels, said drive wheel being driven by said prime mover.

3. The arrangement as claimed in claim 1 wherein said pair of pulley wheels are toothed wheels and said belt is a toothed belt which engages with toothed pulley wheels attached to the inputs of said shaker head assemblies.

4. The arrangement as claimed in claim 1 wherein each mounting means comprises a mounting frame on which the shaker head assembly is located, an arm extending from said mounting frame and a sleeve mounted for rotation on said intermediate shaft, said arm being attached to said sleeve.

5. The arrangement as claimed in claim 4 wherein said shaft extends from a mounting plate, biassing spring means being engaged between a projection on each said sleeve and a fixture on said mounting plate, said biassing spring means biassing said arm extending from said sleeve to a predetermined angular displacement about said intermediate shaft.

6. The arrangement as claimed in claim 5 wherein stop means are provided to determine the angular displacement of said arm in response to said biassing spring means and any angular displacement against the biassing spring means.

7. The arrangement as claimed 1 wherein said prime mover is an hydraulic motor.

8. A harvesting apparatus comprising:
(a) a main frame movable relative to the ground;
(b) power means mounted on said main frame to provide power for the relative movement between said main frame and the ground;
(c) at least one pair of vibrational shaker head assemblies, each of the assemblies having an input and an output with a respective associated input and output member;
(d) a prime mover;
(e) means for converting rotary motion applied to each input into a torsional vibration superimposed on the associated output member, the output members being mounted so as to enable a rotary motion to be superimposed thereon;
(f) an intermediate shaft;
(g) a pair of coupled pulley wheels mounted for rotation on said intermediate shaft, each said pulley wheel having a positively engaging belt which couples it to the input of a shaker head assembly;
(h) drive means for coupling said prime mover to said coupled pulley wheels;
(i) a pair of coupled sprocket wheels mounted for rotation on said intermediate shaft, each of the sprocket wheels being engaged by an endless chain which extends about a toothed ring located on a housing of each respective shaker head assembly, each shaker head assembly being supported by a respective mounting means, each said respective mounting means being mounted for pivotal movement independent of the other mounting means about an axis which is substantially coaxial with the intermediate shaft;
(j) a shaft extending downwardly from each of said shaker head assembly outputs;
(k) at least one set of regularly spaced harvesting finger means, said finger means, in use, coming in contact with produce bearing plants or bushes as said frame moves through or thereover and vibrating and shaking said plants or bushes to cause fruit, berries, or the like produce, to be dislodged therefrom.

9. Apparatus as claimed in claim 8 wherein a pillar extends coaxially downward from below said intermediate shaft, said pillar having a pair of arms pivotally mounted at its lower end to extend radially therefrom, each arm being coupled by an upwardly extending member which is connected to said shaker head assembly mounting means.

10. Apparatus as claimed in claim 8 wherein said shaker head assemblies of said at least one pair are not transversely aligned but are positioned in a staggered relationship to each side of a longitudinal horizontal axis of the harvester frame.

11. A mounting and drive arrangement for shaker head assemblies for a harvesting apparatus, said arrangement comprising:
(a) at least one pair of vibratable shaker head assemblies, one shaker head assembly of said at least one pair being located on one side of a longitudinal axis through the arrangement, and the other shaker head assembly of said at least one pair being located on the other side of said axis, each of said shaker head assemblies having an input and an output with a respective associated input and output member;
(b) prime moving means for applying rotary movement to said input of each shaker head assembly;
(c) vibrating means for converting rotary motion applied to each input into a torsional vibration superimposed on the associated output members, said output members being mounted so that a rotary motion is superimposable thereon;
(d) an intermediate shaft located between said at least one pair of shaker head assemblies;
(e) a pair of coupled pulley wheels mounted for rotation on said intermediate shaft, each said pulley wheel having a positively engaging belt coupling it with the input of a shaker head assembly;
(f) drive means for coupling said prime mover means to said coupled pulley wheels;
(g) a pair of coupled sprocket wheels mounted for rotation on said intermediate shaft, each of said sprocket wheels being engaged by an endless chain which extends about a toothed ring located on a housing of each respective shaker head assembly; and
(h) at least one pair of mounting means for each individually supporting each shaker head assembly of said at least one pair of said shaker head assemblies, each of said mounting means being mounted for free pivotal movement independent of the other mounting means about a common axis which is substantially coaxial with the intermediate shaft.

12. A harvesting apparatus, comprising:
(a) a main frame movable relative to the ground;
(b) power means mounted on said main frame for providing power to create said relative movement between said main frame and the ground;
(c) at least one pair of vibratable shaker head assemblies, one shaker head assembly of said at least one pair being located on one side of a longitudinal axis through said main frame, and the other shaker head of said at least one pair being located on the other side of said axis, each of said shaker head assemblies having an input and an output with a respective associated input and output member;
(d) a prime moving means for applying rotary movement to each input of said shaker head assemblies;
(e) vibrating means for converting rotary motion applied to each input into a torsional vibration superimposed on the associated output member, said output member being mounted so that rotary motion is superimposable thereon;
(f) an intermediate shaft located between said at least one pair of shaker head assemblies;
(g) a pair of coupled pulley wheels mounted for rotation on said intermediate shaft, each of said pulley wheels having a positively engaging belt which couples it to the input of a shaker head assembly;
(h) drive means for coupling said prime moving means to said coupled pulley wheels;
(i) a pair of coupled sprocket wheels mounted for rotation on said intermediate shaft, each of said sprocket wheels being engaged by an endless chain which extends about a toothed ring located on a housing of each respective shaker head assembly;

(j) at least one pair of mounting means, each for individually supporting each shaker head assembly of said at least one pair of shaker head assemblies, each of said mounting means being mounted for free pivotal movement independent of the other mounting means in said at least one pair of mounting means about a common axis which is substantially coaxial with the intermediate shaft;

(k) a shaft extending downwardly from each said shaker head assemblies output; and (l) at least one set of radially spaced harvesting finger means attached to each said shaft, said harvesting finger means, in use, coming in contact with produce bearing plants or bushes as said main frame moves through or thereover and vibrating and shaking said plants or bushes to cause fruit, berries, or the like produce to be dislodged therefrom.

* * * * *